Figure 4:
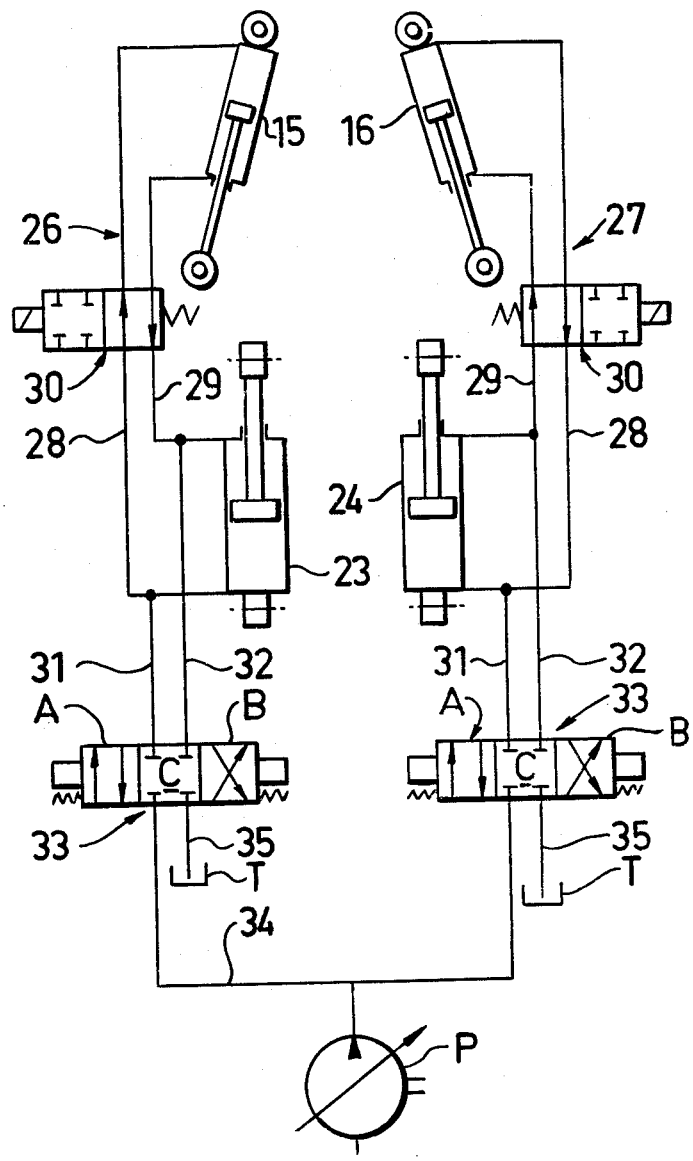

United States Patent [19]

Ericsson

[11] Patent Number: 4,580,797
[45] Date of Patent: Apr. 8, 1986

[54] DEVICE AT CROSS-COUNTRY VEHICLES OR MACHINES

[75] Inventor: Jan E. Ericsson, Umeå, Sweden
[73] Assignee: Umeå Mekaniska AB, Umeå, Sweden
[21] Appl. No.: 637,825
[22] Filed: Aug. 6, 1984
[30] Foreign Application Priority Data Aug. 5, 1983 [SE] Sweden .............................. 8304291

[51] Int. Cl.$^4$ .............................................. B60G 25/00
[52] U.S. Cl. ....................................... 280/6 H; 180/41
[58] Field of Search ................... 180/41, 89.13, 89.14, 180/89.15; 280/6 R, 6 H

[56] References Cited

U.S. PATENT DOCUMENTS

| | | | |
|---|---|---|---|
| 3,976,302 | 8/1976 | Hammarstrand | 280/6 H |
| 4,018,296 | 4/1977 | Knudson | 280/6 H X |
| 4,036,528 | 7/1977 | Langendorf | 280/6 H X |
| 4,236,591 | 12/1980 | Molby | 280/6 H X |

*Primary Examiner*—Robert G. Nilson
*Attorney, Agent, or Firm*—Cushman, Darby & Cushman

[57] ABSTRACT

A self-leveling cross-country vehicle is provided with a carrier frame which is pivotally mounted to the vehicle frame about the longitudinal and transverse axes. Hydraulic cylinders are connected to each side of the mounting shafts of the carrier frame which are connected to a hydraulic pressure circuit. The wheels of the vehicle are mounted on axles which is provided with a hydraulic piston also connected to the hydraulic pressure circuit. The up and down movement of the axles as the vehicle travels over the ground actuates the hydraulic piston which levels the carrier frame with respect to the ground.

7 Claims, 4 Drawing Figures

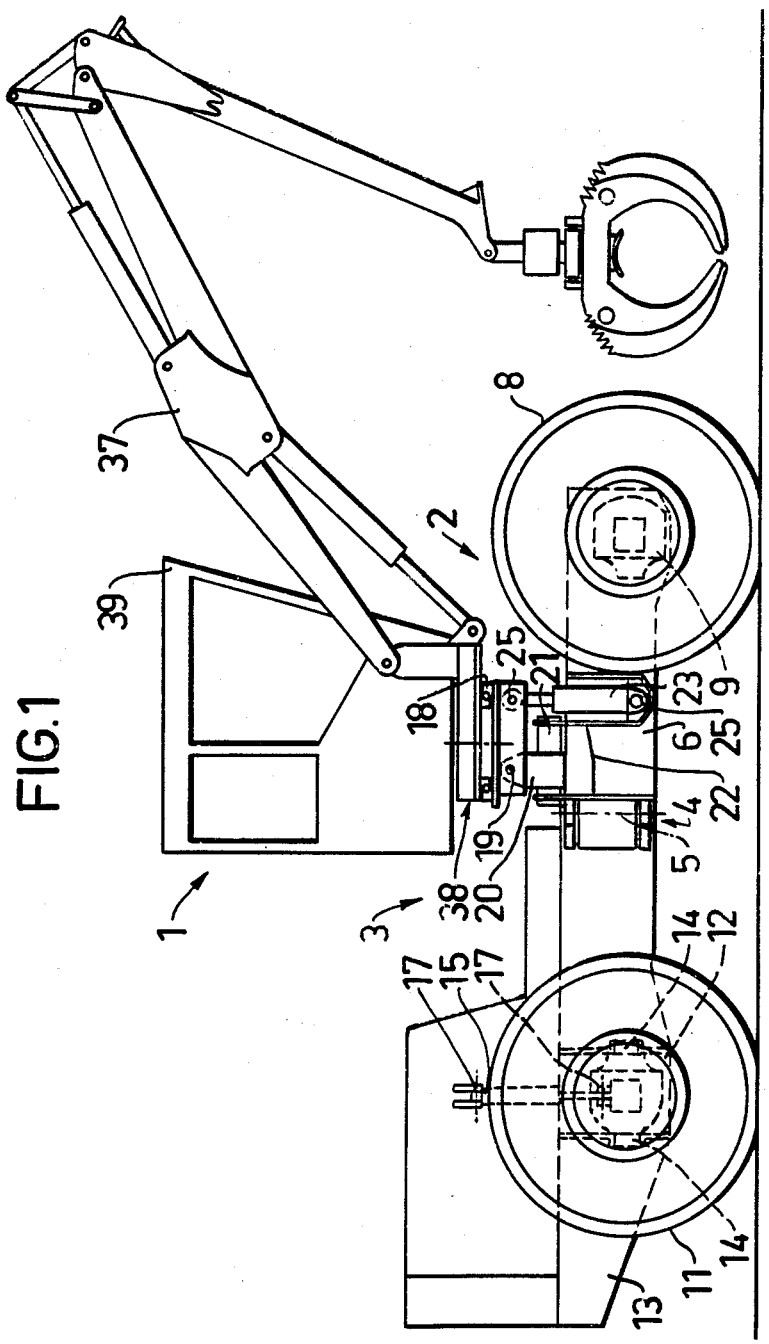

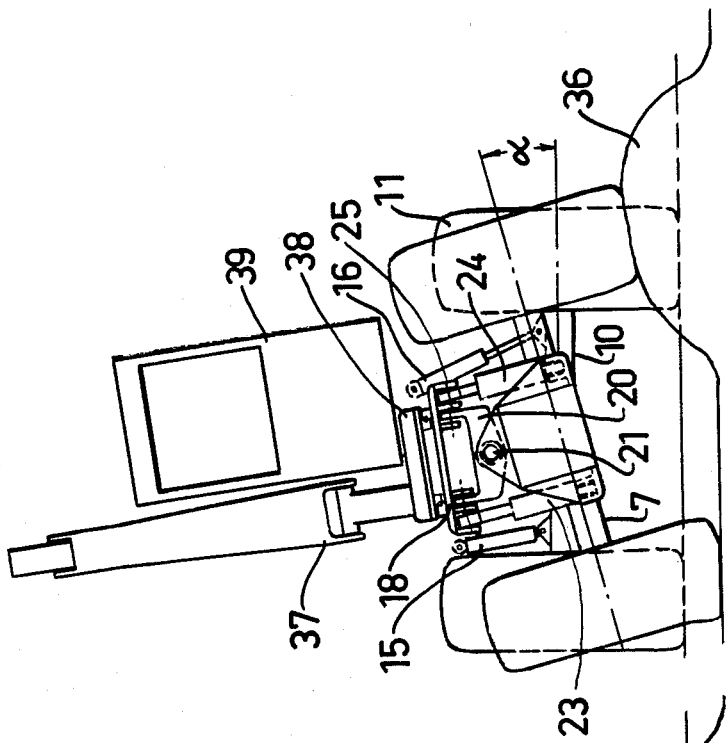
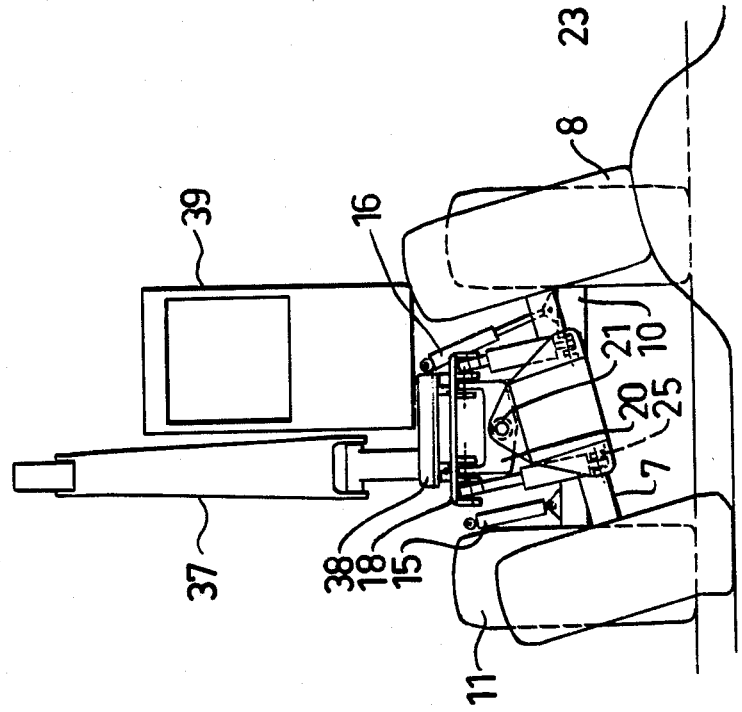

DEVICE AT CROSS-COUNTRY VEHICLES OR MACHINES

This invention relates to a device at cross-country vehicles or machines with a superstructure, e.g. driver's cab, arranged on the chassis of the vehicle or machine, for position adaptation of the superstructure to existing ground conditions.

As to cross-country vehicles and machines such as wood machines intended for work under varying character of the terrain the importance of being able to adapt the position of the chassis of the machine and consequently the driver's cab attached thereon to the terrain in order to reduce the movement of the driver's cab sideways and to try in this way to improve the driver's working conditions has been realized more and more. It is therefore known to arrange each wheel shaft as centrally suspended at the chassis in one point only which is so articulated that the shaft can swing on a plane approx. perpendicular to the longitudinal direction of the chassis, and to arrange pressure medium cylinders between the chassis and each oscillatorily suspended wheel shaft on each side of the suspension point of the respective wheel shaft for adjusting the chassis relative to the wheel shafts.

Thus, this known device requires a pendulum suspension of all the wheel shafts and has therefore a restricted use and, moreover, this known device does not make possible any individual adjustment of the driver's cab.

It is therefore the object of this invention to provide a device of the type indicated above which does not require a pendulum suspension of each wheel shaft and which is to make possible an adjustment of e.g. the driver's cab relative to the chassis. Moreover, the device should be so constituted that its construction is simple and its operation reliable and that it requires simple control valves existing on the market.

This object is achieved in that the device of the invention is provided with the characteristic features set forth in the claims.

The invention is described in the following with reference to the appended drawings, in which FIG. 1 shows schematically a lateral view of a cross-country machine provided with the device according to the invention, FIG. 2 is a front view of the machine in FIG. 1 when passing a elevation and with a connected pressure medium system, FIG. 3 shows the same as in FIG. 2 but with the driver's cab of the machine horizontalized by means of a second pressure medium system, and FIG. 4 shows a pressure medium scheme of the device according to this invention.

1 designates on the drawings a cross-country vehicle with a front part 2 with one shaft and a rear part 3 also with one shaft, which are interconnected through a waist portion 4 with a vertical shaft 5 and pressure medium cylinders acting between said parts 2, 3 for the control of the vehicle in a way known per se. The waist portion 4 between the parts 2, 3 is such that the parts are so stiff against torsion relative to each other that if one part is subjected to a torsional movement or force this is transferred to the other part and vice versa.

The front part 2 is provided with a wheel shaft 7 rigidly arranged in the chassis 6 of the front part and which is called front shaft in the following and supports wheels 8. The front shaft in FIG. 1 is shown as provided with a differential gear 9.

The rear part 3 is provided with a wheel shaft 10 which is called rear shaft in the following and supports wheels 11. In FIG. 1 the rear shaft 10 is also shown as provided with a differential gear 12. As distinguished from the front shaft 7 the rear shaft 10 is pivotally suspended at a point in the chassis 13 of the rear part by means of pins 14 mounted in the chassis and thus operates as a swing axle. One each side of its suspension point 14 in the chassis 13 the rear shaft 10 of the rear part is connected to said chassis by means of pressure medium cylinders 15 and 16, respectively, which are articulatedly attached to the chassis 13 as well as the wheel shaft 10 by means of pivot pins 17 (FIG. 1).

Moreover, in accordance with the invention the front part is provided with a tilt plate 18, on which the driver's cab 39 of the machine or vehicle and/or another structure or superstructure can be arranged, as shown on the drawings. The tilt plate 18 is pivotably connected through a shaft or shaft pins 19 parallel to the wheel shaft 7 (as seen from above) with a substantially U-shaped carrying means 20 which, in its turn, is supported by a supporting shaft 21 rotatably mounted in bearing cages 22 arranged at the chassis 6 of the front part. Instead of having the carrying shaft 21 rotatably mounted the carrying means 20 can be rotatably arranged on the carrying shaft 21. This shaft extends perpendicularly to the front shaft 7 and is located in the longitudinal vertical central plane of the front part. With the front and rear parts lying in a line with each other the carrying shaft 21 is also in the same vertical plane as the shaft pins 14 of the oscillatorily suspended wheel shaft 10 of the rear part.

Moreover, the tilt plate 18 of the front part is connected with the chassis 6 of the front part by means of two pressure medium cylinders 23, 24, which are arranged on each their side of the carrying shaft 21 and at the same distance from this and are articulatedly attached to the tilt plate 18 as well as the chassis 6 by means of pivot pins 25.

The pressure medium cylinders 23, 24 of the tilt plate are arranged to hold the tilt plate 18 in an intermediate position so that it is parallel to the chassis 6 of the front part, as shown in FIG. 1.

As is apparent from the pressure medium scheme shown in FIG. 4 the pressure medium cylinders 15, 23 and 16, 24, respectively, placed on the same side of the longitudinal axis of the vehicle are included in each their pressure medium circuit 26 and 27, respectively, each comprising a pressure medium conduit 28 connecting the piston side of the cylinders included in the relative circuit with each other, and a pressure medium conduit 29 connecting the piston rod side of these cylinders with each other. In the conduits 28, 29 of each pressure medium circuit an electrically controlled locking valve 30 is included which in the position shown in FIG. 4 allows a flow from one cylinder to the other and a return flow in opposite direction and which in its other position completely shuts off the connection for pressure medium through the conduits 28, 29 between the cylinders 15, 23 and 16, 24, respectively.

The conduits 28, 29 in each pressure medium circuit 26, 27 are connected through a line 31 and 32, respectively, to a controlled four-way three-position valve 33 with spring return to a closed intermediate position C. These valves 33 are arranged as operating valves for the two pressure medium cylinders 23, 24 of the tilt plate and are connected via conduits 34, 35 to a pressure medium source P and a tank T, respectively.

With the valves 33 adjusted to their intermediate position C the pressure medium circuits 26 and 27 are closed and a flow is allowed between the cylinders in the relative circuit 26, 27 as long as the locking valves 30 are in the open position shown in FIG. 4.

Supposing that the vehicle with the valves 30, 33 thus adjusted are driven with one of its front wheels 8 up onto a stone 36 or the like, as shown in FIG. 2, torsional forces transmitted from the front part 2 to the rear part 3 will rise and be taken up by the pressure medium cylinders 15, 16 of it oscillatorily suspended wheel shaft. The cylinder 15, i.e. that of the cylinders 15, 16 of the rear part located on the opposite side of the actuated front wheel 8, will be subjected to increased compressive forces resulting in that a pressure medium is pressed out of the piston side of the cylinder 15 and into the cylinder 23 on its piston rod side, while the other cylinder 16 of the rear part is subjected to increased tensile forces resulting in that pressure medium is pressed out of the piston rod side of the cylinder 16 and into the cylinder 24 on its piston rod side. By this the chassis 6, 13 of the vehicle will be adjusted obliquely relative to the rear shaft 10 remaining in the horizontal plane, but in accordance with the present invention the driver's cab 39 arranged on the plate 18 will be inclined less than the chassis 6, 13 relative to the horizontal plane because the cylinders 23, 24 of the tilt plate according to the invention are provided with a greater cylinder area than the cylinders 15, 16 of the rear shaft and have a less reciprocal distance between their points of attachment at the tilt plate 18 than the cylinders 23, 24 of the rear shaft have between their points of attachment at the rear shaft 10.

When the vehicle during its continued travel passes the obstacle 36 with one of its rear wheels 11 and has arrived at a horizontal ground with its front wheels 8 the chassis 6, 13 will not be turned but only the oscillatorily suspended rear shaft 10 in that the cylinder 16 is compressed and the other cylinder 15 is extended in a corresponding degree, which results in that the cylinder 24 of the tilt plate is extended and its other cylinder 23 is pushed together and adjusts the tilt plate 18 and the driver's cab placed thereon to a position having a reduced angle of inclination relative to the horizontal plane than the rear shaft. In other words, the movement of the driver's cab is laterally reduced relative to the torsional movement of the chassis or rear shaft caused by an obstacle and thus, by changing the area ratio between the cylinders of the rear and front part and the distance ratio between said points of attachment of the cylinders of the rear and front part, the degree of reduction of the lateral movement of the tilt plate and consequently the driver's cab relative to the torsional movement of the chassis and the rear shaft caused by an obstacle can be determined from case to case. In the example shown on the drawings the inclination of the driver's cab is reduced to about half the inclination of the chassis or rear shaft relative to the horizontal plane with the pressure medium circuits 26, 27 connected in the way shown in FIG. 4.

Thus, with the pressure medium circuits 26, 27 connected in the way shown in FIG. 4 a reduction of the lateral movement of the driver's cab relative to the torsional movement of the chassis or rear shaft caused by the obstacle is obtained when passing an obstacle, but according to this invention it is further possible to bring the driver's cab to enter a horizontal position during travel as well as at a standstill. For this it is only required, when a vehicle is at a standstill, that the locking valves 30 are closed, the rear shaft 10 being locked in its position relative to the chassis and becoming rigidly connected to this in a butt relationship. After this the tilt plate 18 can be turned individually relative to the chassis 6, 13 by the aid of its pressure medium cylinders 23, 24 and be adjusted horizontally. Supposing for instance that the tilt plate 18 is to be brought to horizontal position from the position shown in FIG. 2 the locking valves 30 will first be closed and then the operating valve 33 of the cylinder 23 is set at the same time to its position A and the operating valve 33 of the cylinder 24 to position B. The cylinder 23 is then pushed out while the cylinder 24 is drawn together in a corresponding degree and the tilt plate is turned around its shaft 21 until it becomes horizontal, the operating valves 33 entering their closed intermediate position C manually or automatically, e.g. by means of any position indicating means known and therefore not shown, after which the tilt plate 18 is retained in its horizontal position by its pressure medium cylinders 23, 24. Should the tilt plate 18 be inclined downwards or upwards relative to the horizontal plane this inclination can also be eliminated by adjusting the two operating valves 33 to position A at the same time, meaning that the cylinders 23, 24 are extended and swing the tilt plate 18 counter-clockwise about its shaft 19 in FIG. 1, and position B, respectively, meaning that the cylinders 23, 24 are contracted and swing the tilt plate 18 clockwise about its shaft 19 in FIG. 1. When the tilt plate 18 is horizontal the operating valves 33 are returned, manually or automatically, e.g. by means of a position indicating means, to their closed intermediate position C and the pressure medium cylinders 23, 24 are then locked and maintain the tilt plate 18 in its horizontal position.

It is apparent from this that the tilt plate 18 can be adjusted in horizontal position however the vehicle is parked in a descent and also when the vehicle is driven downwards or upwards a slope or across this, the locking valves 30, however, not being closed for locking the rear shaft 10 during travel. Thus, the device of the present invention allows of almost unlimited possibilities of adjusting the driver's cab 39 horizontally independently of the ground conditions and consequently of adapting the position of the tilt plate to different terrain conditions and working operations so that the tilt plate 18 and the driver's cab 39 arranged thereon and possible working tools, e.g. a crane 37, as shown on the drawings, can be given the position most favourable from the driver's point of view. In the example shown on the drawings the driver's cab 39 and the crane 37 are pivotably arranged on the tilt plate 18 by means of a pressure medium operated turning rim 38 of some type known per se, which is made possible thanks to the device according to the invention.

As the tilt plate 18, in accordance with the principles on which the present invention is based, can be turned individually about two shafts 19, 21 arranged perpendicular to each other relative to the chassis 6, 13 of the vehicle the device according to this invention is applicable to any cross-country vehicle or machine for adjusting the driver's cab of the vehicle to the most favourable position from the driver's point of view relative to the horizontal plane, and this adjustment can be carried out during travel as well as when the vehicle has been stopped manually by means of a lever in the driver's cab or more or less automatically, especially during travel, by means of position indicating means controlling the operating valves 33. In other words, the vehicle or the machine, on which the present device is intended to be arranged, need not be provided with a oscillatorily suspended shaft, as shown on the drawings, but this arrangement has the advantage that a so-called bogie effect is obtained reducing the rate of lateral and vertical movement to about the half and the acceleration of lateral and vertical movement to about one fourth for a single shaft and consequently a more gentle, convenient and smooth motion during travel. In order to achieve this bogie effect the vehicle need not be provided with an oscillatorily suspended wheel shaft but may instead be provided with a turning waist portion with two pressure medium cylinders for turning the front and rear parts of the machine relative to each other around the longitudinal shaft of the turning waist portion in dependence of the ground conditions. The pressure medium cylinders of the turning waist portion thus replace the cylinders 15, 16 of the swing axle shown on the drawings.

As to the operation it should be mentioned that also if this is carried out so to say automatically there should always be a possibility of manual operation.

The device of the invention can also be arranged on vehicles or machines not being provided with waist portion control and articulated chassis but are conveniently steered via the front and/or rear wheels.

This invention is not restricted to what has been described above and shown on the drawings but can also be changed and modified in several different ways within the scope of the inventive thought defined in the claims.

What I claim is:

1. A vehicle comprising a chassis; a carrying means adapted for supporting a driver's cab, the carrying means being pivotally connected to the chassis about first and second horizontal shafts, the first shaft being arranged along the longitudinal axis of the vehicle, the second shaft being arranged along the transverse axis of the vehicle, each shaft capable of being pivoted by a first set of pressure operated cylinders, said pressure operated cylinders being connected to a fluid pressure circuit, the vehicle further including a second set of pressure operated cylinders connected to the fluid pressure circuit and connected to a mounting means for ground engaging wheels, the second set of pressure operated cylinders being actuated by a vertical movement of the wheels as the vehicle moves over the ground, whereby the fluid within the fluid pressure circuit and the first set of cylinders maintains the carrying means level with respect to the ground.

2. A vehicle according to claim 1 wherein the vehicle is provided with at least one pair of wheels rotatably mounted on a shaft, the shaft being pivotally mounted about the longitudinal axis of the vehicle, the longitudinal shaft of the carrying means lying in the same vertical plane as the axis of the pivot of the shaft supporting the wheels.

3. A vehicle according to claim 2, wherein the pressure medium cylinders of the carrying means have a greater cylinder area than those of the wheels.

4. A vehicle according to claim 2, wherein the pressure medium cylinders of the carrying means are located at the same distance from the longitudinal shaft of the carrying means and have a distance between their points of attachment to the carrying means which is less than the distance between the points of attachment of the pressure medium cylinders of the wheel shaft.

5. A vehicle according to claim 2, wherein a locking valve for closing a connection between the pressure medium cylinders of the carrying means and the pressure medium cylinder of the wheel shaft is arranged in two pressure medium circuits for separate connection and operation of the pressure medium cylinders of the carrying means.

6. A vehicle according to claim 1, wherein separate operating valves are arranged for connection and operation of the pressure medium cylinders of the carrying means.

7. A vehicle according to claim 6, wherein the operating valves of the pressure medium cylinders of the carrying means are electrically controlled four-way three-postion valves with spring return to a closed central position.

* * * * *